(12) United States Patent
Adams

(10) Patent No.: US 8,468,462 B2
(45) Date of Patent: Jun. 18, 2013

(54) DISPLAY MANAGEMENT IN A MULTI-WINDOW DISPLAY

(75) Inventor: James S. Adams, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 1409 days.

(21) Appl. No.: 11/973,809

(22) Filed: Oct. 9, 2007

(65) Prior Publication Data

US 2009/0094549 A1    Apr. 9, 2009

(51) Int. Cl.
*G06F 3/048* (2006.01)

(52) U.S. Cl.
USPC .......................... 715/778; 715/788; 715/802

(58) Field of Classification Search
USPC .................. 715/764, 767, 778, 791, 792, 794, 715/796, 802, 808, 809, 821, 788
See application file for complete search history.

(56) References Cited

U.S. PATENT DOCUMENTS

| | | | |
|---|---|---|---|
| 4,574,364 A | 3/1986 | Tabata et al. | |
| 4,783,648 A | 11/1988 | Homma et al. | |
| 4,974,196 A | 11/1990 | Iwami et al. | |
| 5,060,170 A | 10/1991 | Bourgeois et al. | |
| 5,091,866 A | 2/1992 | Takagi | |
| 5,129,055 A | 7/1992 | Yamazaki et al. | |
| 5,390,295 A | 2/1995 | Bates et al. | |
| 5,487,143 A | 1/1996 | Southgate | |
| 5,561,757 A | 10/1996 | Southgate | |
| 5,657,463 A | 8/1997 | Bingham | |
| 5,675,755 A | 10/1997 | Trueblood | |
| 5,712,995 A | 1/1998 | Cohn | |
| 5,734,380 A | 3/1998 | Adams et al. | |
| 5,796,403 A | 8/1998 | Adams et al. | |
| 5,880,725 A | 3/1999 | Southgate | |
| 6,002,400 A | 12/1999 | Loring et al. | |
| 6,031,530 A | 2/2000 | Trueblood | |
| 6,509,915 B2 | 1/2003 | Berman et al. | |
| 6,570,595 B2 | 5/2003 | Porter | |
| 6,573,913 B1 * | 6/2003 | Butler et al. | 715/761 |
| 6,600,500 B1 | 7/2003 | Yamamoto | |
| 6,678,867 B2 | 1/2004 | Fong et al. | |
| 6,724,406 B1 | 4/2004 | Kelley | |
| 6,760,048 B1 | 7/2004 | Bates et al. | |
| 6,873,345 B2 | 3/2005 | Fukuda et al. | |
| 7,624,354 B2 * | 11/2009 | Czerwinski et al. | 715/792 |
| 7,743,340 B2 * | 6/2010 | Horvitz et al. | 715/808 |
| 2003/0210278 A1 | 11/2003 | Kyoya et al. | |
| 2004/0098462 A1 * | 5/2004 | Horvitz et al. | 709/207 |
| 2004/0210847 A1 | 10/2004 | Berson et al. | |
| 2005/0086610 A1 * | 4/2005 | Mackinlay et al. | 715/817 |
| 2006/0070008 A1 | 3/2006 | Sauve et al. | |
| 2007/0192733 A1 | 8/2007 | Horiuchi | |

* cited by examiner

*Primary Examiner* — Haoshian Shih

(57) ABSTRACT

Devices and methods for controlling displays in a multi-display environment are disclosed. An exemplary method may comprise the following steps. Initially, an exemplary method may continuously track and record currently active display surfaces. Next, the exemplary method may identify the display surface that is determined to have been active immediately prior to the newly invoked display. After updating the specification file for the newly invoked display to include the identity of the display surface just identified, the exemplary method may be completed by displaying the newly invoked display on the same display surface as previously identified. In the event that the newly invoked display is a critical display, both the newly invoked display and the display determined to have been active immediately prior to the invoked display may be assigned an always-on-top status.

20 Claims, 7 Drawing Sheets

Display 1

Display 2

Display 3

Display 4

```
┌─────────────────────────────┐
│   FILE NAME: XYZ            │
├─────────────────────────────┤
│   TEMP TREND b1             │
│   TEMP TREND b2             │
├─────────────────────────────┤
│                             │
│   LOCATION OF DATE          │
│        FOR b1               │
│                             │
│   LOCATION OF DATE          │
│        FOR b2               │
│                             │
├─────────────────────────────┤
│   CATEGORY:  TR             │
├─────────────────────────────┤
│   APPROPRIATE DISPLAY:  D8  │
└─────────────────────────────┘
```

FIG. 7

DISPLAY MANAGEMENT IN A MULTI-WINDOW DISPLAY

FIELD OF THE INVENTION

The present invention relates to a display system, and more particularly, to locating newly invoked displays in a multi-window computer environment.

BACKGROUND OF THE INVENTION

Existing multi-window computer environments do not differentiate between multiple open displays with identical window and sub-window configurations. This lack of display differentiation between parent displays and newly invoked displays inhibits the ability for a potential automated window management system to provide newly invoked display placement.

In many applications, including plant control networks, an operator may monitor one or more computer screens with each computer screen containing multiple displays representing similar or identical processes or events. As the operator interacts with the screens and displays, displays may often change status back and forth from "active" and "non-active". In real-time feedback applications, new displays are often invoked and for a variety of reasons. In addition, the formatting of many of the newly invoked displays does not uniquely identify a single parent display. Due to these factors, current automated window management systems may not always intelligently and predictively disposition newly invoked displays in a multi-windows computer display environment.

Accordingly, an efficient and effective device, system, and method are needed for ensuring that human-computer interaction display windows are intelligently and predictively dispositioned with respect to the currently active window.

SUMMARY OF THE INVENTION

It is, therefore, an objective of the present invention to provide devices and methods for appropriately locating newly invoked displays in a multi-window display environment. According to an exemplary embodiment of the present invention, the device may control a computer window display of a multi-window display environment. A newly invoked display may be located precisely in proximity to the display from which the new display was invoked, even in the case when the receiving display is not the currently active display. The device may track currently active displays, identify the display that is determined to have been active immediately prior to the invoking of the new display, and display each newly invoked display on the same display as previously identified.

According to an exemplary embodiment, the device may additionally locate a newly invoked display identified as a critical display. The device may receive a display created in response to a display request inputted to a system; determine whether each display is a critical display according to its display specification file; and if the newly invoked display is determined to be a critical display, promote the display status of both the newly invoked display and its' receiving display to an always-on-top status. In an exemplary embodiment, the device may be used in a multi-window display environment in which two or more of the displays in the environment have identical display characteristics.

According to an exemplary embodiment of the present invention, the method may involve the following steps. Currently active displays may be tracked and recorded. The display that is determined to have been active immediately prior to a newly invoked display may be identified to be the receiving display. The newly invoked display may be displayed in the appropriate section of the receiving display, as determined by the window specification file. In an alternate embodiment, the newly invoked display may be displayed in close proximity to the parent display. In an exemplary embodiment, the method of appropriately locating a newly invoked display may be performed through the use of a display management system.

BRIEF DESCRIPTION OF THE DRAWINGS

The above and other objectives and advantages of the present invention will be apparent upon consideration of the following detailed description, taken in conjunction with the accompanying drawings, in which like reference numbers refer to like parts throughout, and in which:

FIG. 7 represents an exemplary specification file used to intelligently disposition a newly invoked window.

DETAILED DESCRIPTION OF THE INVENTION

Figure 1:
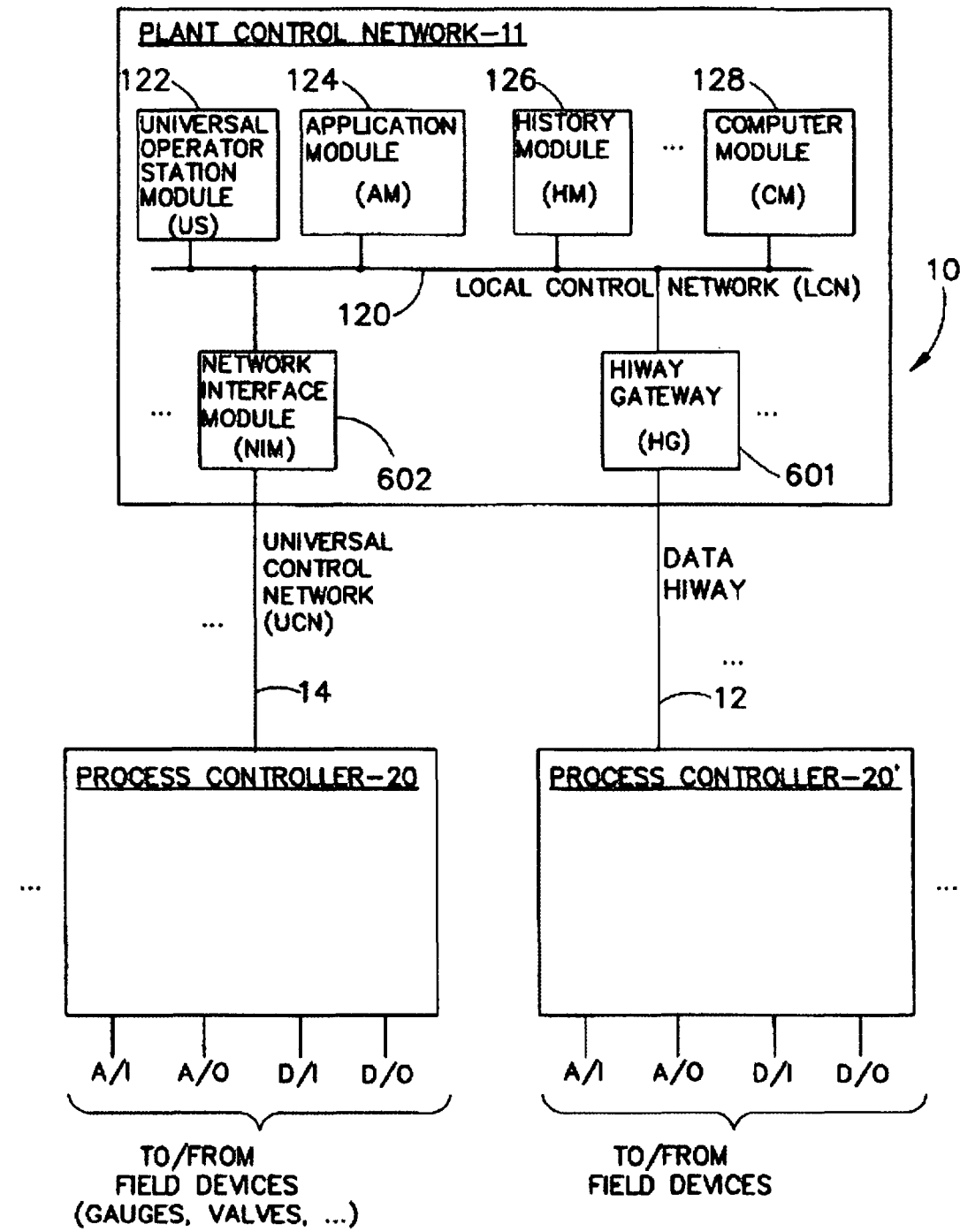
FIG. 1 represents a block diagram of a process control system in which an exemplary embodiment of the present invention may be used.

Before describing embodiments of the present invention, it will be helpful to understand a system environment in which the present invention may be utilized. Referring to FIG. 1, a block diagram of a process control system 10 is shown. An exemplary embodiment of the present invention may be used in such a system. The process control system 10 may include a plant control network 11 connected to a process controller 20' via a data hiway 12. Additional process controllers 20' may be connected to the plant control network 11 via an additional hi way gateway (HG) 601 and an additional data hiway 12. A process controller 20 may connect to the plant control network 11 via a universal control network (UCN) 14 to a network interface module (NIM) 602. The process controller 20 may be an updated interface apparatus allowing the process control system 10 to include many new improvements and features over the process controller 20'. Additional process controllers 20 may be connected to the plant control network 11 via an additional NIM 602 and an additional UCN 14. The process controllers 20, 20' may interface the analog input and output signals (A/I and A/O, respectively) and digital input and output signals (D/I and D/O, respectively) to the process control system 10 from the various field devices (not shown). The field devices being controlled may include valves, pressure gauges, thermocouples, etc.

The plant control network 11, in conjunction with a plant operator interacting with a computer display, supervise the controlled process. The plant control network 11 may comprise the following physical modules: a universal operator station (US) 122, an application module (AM) 124, a history module (HM) 126, a computer module (CM) 128, and any backup or secondary modules necessary to monitor and control any given process. Each of these modules connect to a local control network (LCN) 120 which allows each of the modules to communicate with each other, as necessary. The network interface module NIM (602) interfaces the LCN 120 and the UCN 14. The hi way gateway (HG) 601 interfaces the LCN 120 and the data hi way 12.

The universal operator station (US) 122 may be a workstation for one or more plant operators. The history module (HM) 126 may provide mass data storage capability for binary data. The data stored may typically include trend histories, event histories, etc. The application module (AM) 124 may provide additional data processing capability to support the process control functions performed by the controllers associated with the process control subsystem 20, 20'. Examples of such processing capabilities may include data acquisition, alarming, batch history collection, and providing continuous control computational facilities when needed. The computer module (CM) 128 may comprise a general-purpose data processing system to communicate with other physical modules of the plant control network 11. The local control network (LCN) 120 may be a high-speed communication network that interconnects all of the physical modules of the plant control network 11.

Figure 2:
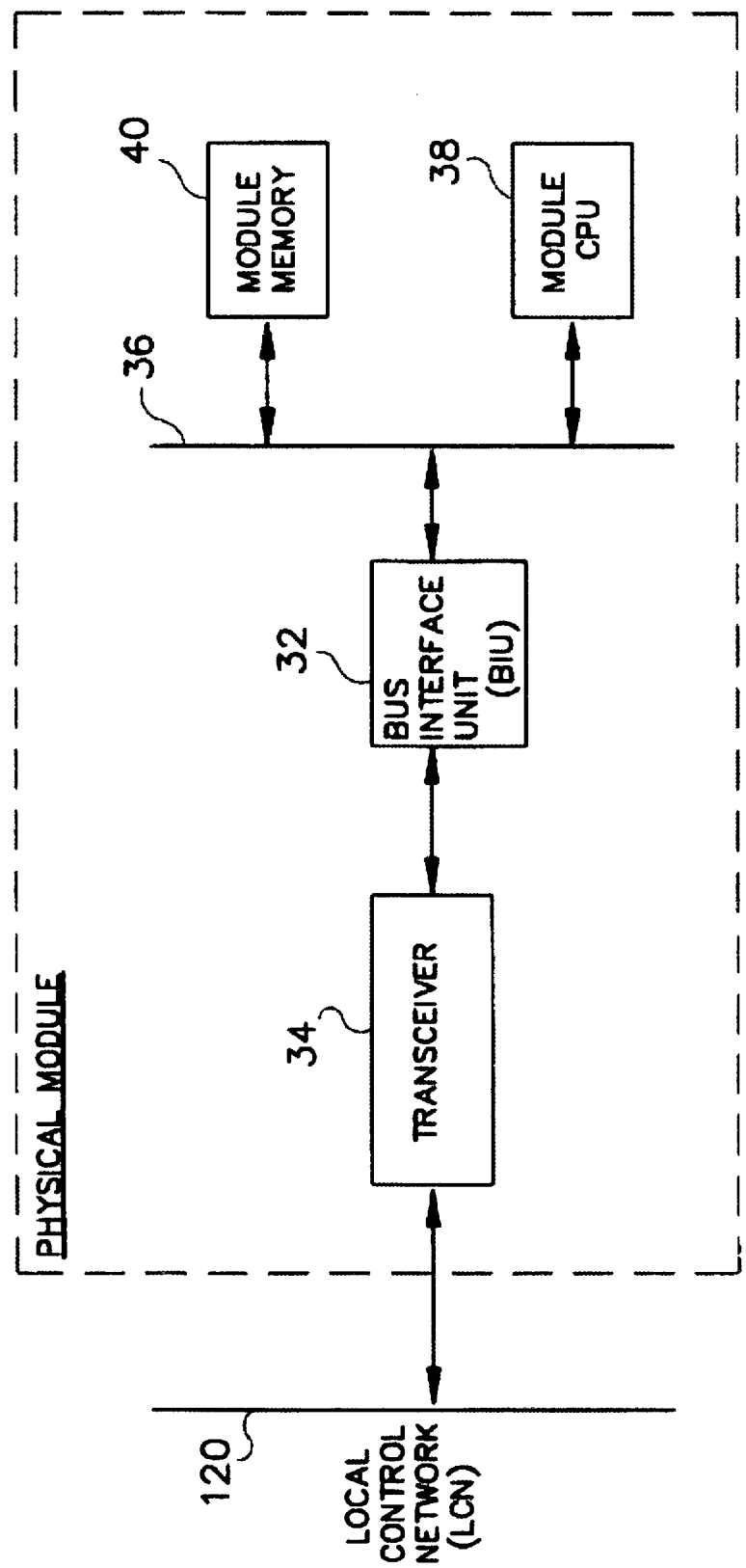
FIG. 2 represents a block diagram of common elements of each physical module of the process control system of FIG. 1.

Referring to FIG. 2, there is shown a block diagram of the common components of each physical module in an exemplary embodiment of the plant control network 11. Each of the physical modules may include a module central processing unit 38 and a module memory 40. The module CPU 38 and the module memory 40 may be configured to provide the desired functionality of the physical module in which they are contained. A random access memory and additional controller devices may also be contained in the physical module; however, they are not shown in FIG. 2. The data-processing capabilities of each module's CPU 38 and module memory 40 create a distributed processing environment, which may provide improved reliability and performance within the process control system 10. A failure in one physical module may not disable the entire plant control network 11.

Each physical module may also contain a BUS interface unit (BIU) 32, which may connect to the LCN 120 through a transceiver 34. Communication between the module CPU 38, the module memory 40, and any additional units (not shown) may be performed through the common connection to a module BUS 36. Any additional units necessary to accommodate the functionality of a physical module may also be connected to the module BUS 36, therefore allowing communication between all of the units of the physical module via the module BUS 36.

Figure 3:
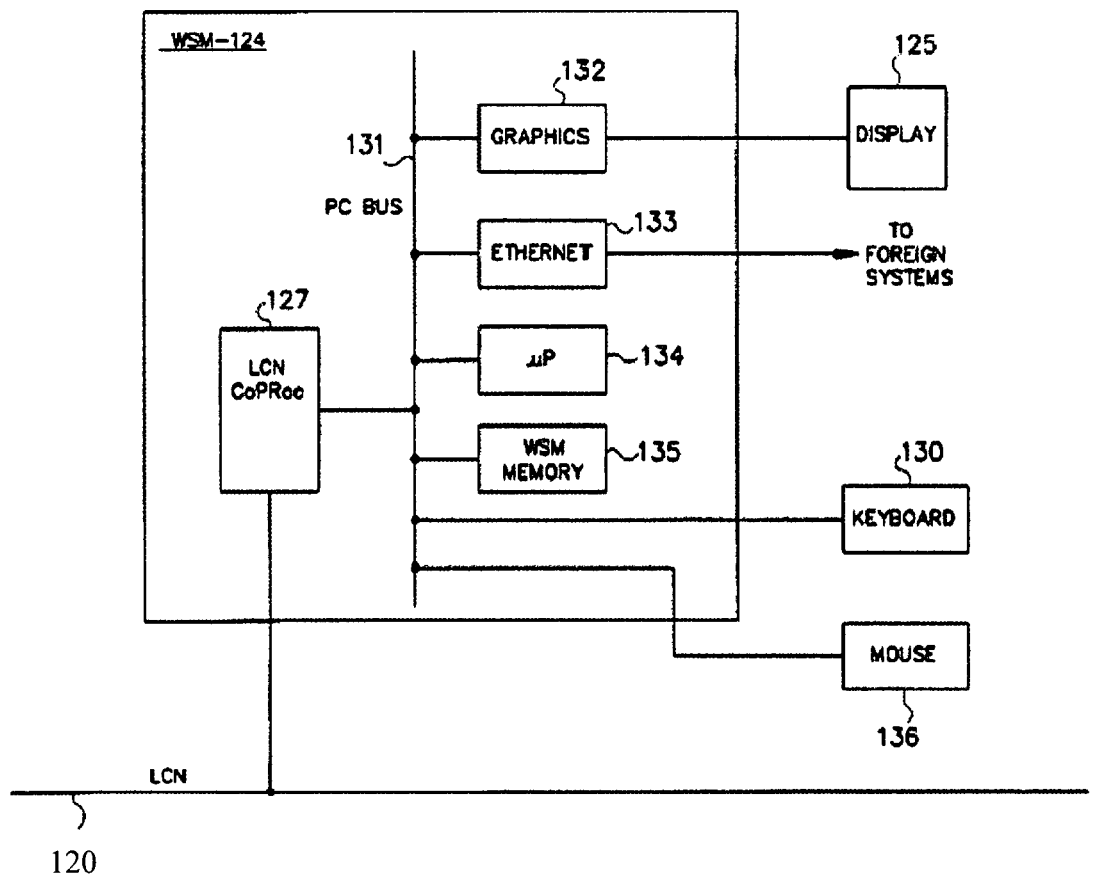
FIG. 3 represents a block diagram of an exemplary embodiment of a workspace manager display system.

The display system which incorporates an exemplary embodiment will now be described. Referring to FIG. 3, a block diagram of a Workspace Manager (WSM) Display System 300 is shown. An exemplary embodiment of the WSM Display System 300 may contain a Workspace Manager 124 connected to the LCN 120 of the process control system 10. In one exemplary embodiment, the WSM 124 may be a personal computer (PC) which may include an LCN co-processor 127 coupled to the LCN 120 and to an internal BUS (PC BUS) 131 of the PC or WSM 124. The BIU 32, the module BUS 36, the module CPU 38, and the module memory 40 (all described above) may be contained within the LCN co-processor 127. In the configuration of this exemplary embodiment, the WSM 124 may communicate with the LCN 120 and any nodes connected thereto.

Components of the WSM 124 that are connected to the PC BUS 131 may include a graphics card 132, an Ethernet card 133, a microprocessor (μp), and a WSM memory 135. An external keyboard 130 and mouse interface 136 may be used for inputting commands to the WSM 124. The graphics card 132 may additionally couple to a display 125. The Ethernet card 133 may allow the WSM 124 to communicate with external systems not coupled to the LCN 120. The microprocessor (μp) 134 may execute an operating system and the Workspace Manager software. The WSM memory 135 may store information including configuration files critical to proper window display management. (Configuration files relevant to the present invention will be described later.)

Figure 4:
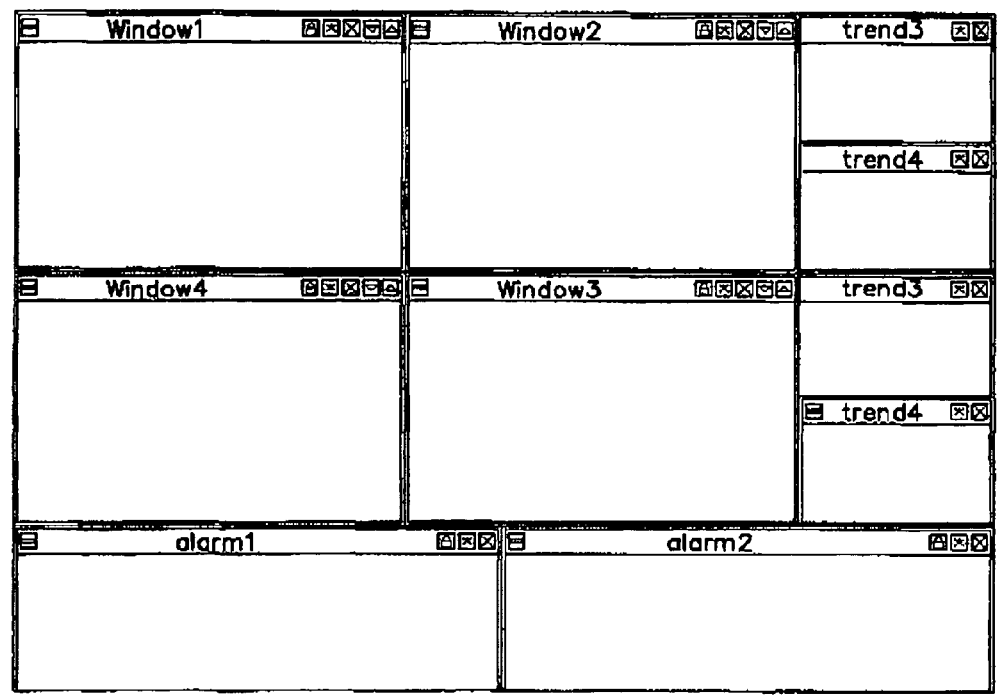
FIG. 4 represents an exemplary configuration of a display screen (sometimes referred to as a display surface) of the display in a Workspace Manager System (WSM)

In order to display multiple windows in an intelligent and predictable manner, characteristics of the display 125 of WSM 124 are configured in a predetermined manner. Referring to FIG. 4, an example of a possible configuration of a display screen (often referred to as a display surface) of the display 125 is shown. Windows labeled "Window 1", "Window 2", "Window 3", and "Window 4" may be reserved for schematics. Windows labeled "trend 3" or "trend 4" may be reserved for trends. Windows labeled "alarm 1" or "alarm 2" may be reserved for alarms. The workspace management program may be run by the microprocessor 134 of WSM 124.

In order to achieve the configuration of a display screen as represented in FIG. 4, a window specification file (often referred to as a configuration file) may be provided to the workspace management software. The window specification file may contain a set of window properties, which may be applied to one or more process application windows during runtime. The window properties contained in the window specification file may govern the physical characteristics and physical location of all newly invoked displays requested during runtime of any application. This will be further described herein under.

Figure 5:
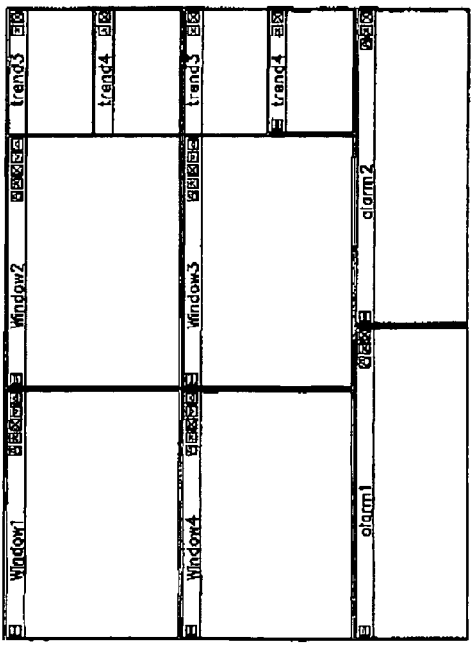
FIG. 5 represents an exemplary configuration (in a multiple process application) of the display in a Workspace Manager System (WSM)
Figure 5:
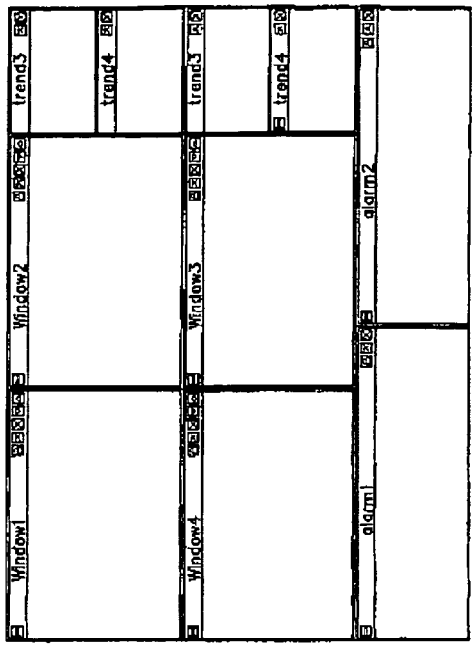
Figure 5:
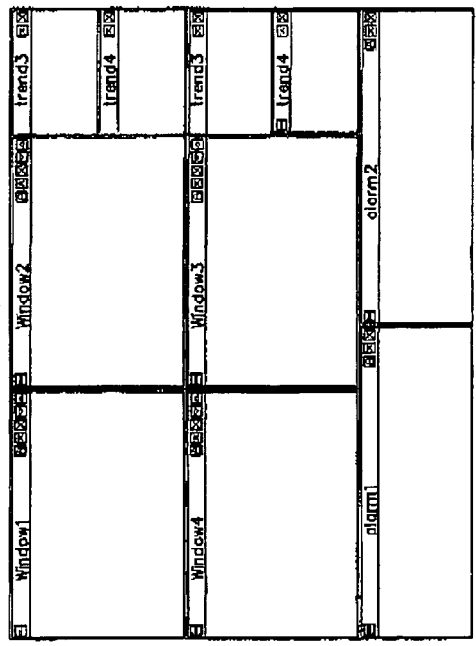
Figure 5:
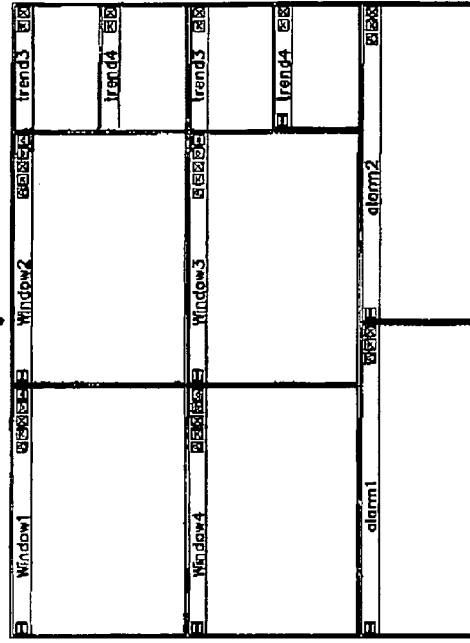

In an exemplary plant process control application, displayed and monitored information may contain multiple separate displays which may be identical in fashion or appearance. Although the displays may appear identical, each display may represent different processes in the plant control network 11. An example of such a display screen on the display 125 of the WSM 124 is represented in FIG. 5. Displays 1, 2, 3, and 4 represent four distinct monitor and control processes; however, the four displays may appear identically configured. Applications and specific displays may vary from the example shown in FIG. 5 although the functionality of an exemplary embodiment of the present invention may still apply. Referring to FIG. 5, an operator would expect a newly invoked display requested by the application process represented in Display 1 to be displayed in the display surface of Display 1. If the request originated from the process represented in Display 2, the window would be expected to be displayed in the display surface of Display 2. These operator expectations may be true regardless of which display screen is currently "active". To achieve this logical and intelligent dispositioning of a newly invoked display, an exemplary embodiment of the current invention may initially continuously track and record currently "active" displays. Secondly, the exemplary embodiment may identify the display surface that is determined to have been active immediately prior to the request for a new display. Thirdly, the exemplary embodiment may update the specification file for the newly invoked display to include the identity of the display surface just identified. Finally, the exemplary embodiment may display the newly invoked display on the same previously identified display surface.

Figure 6:
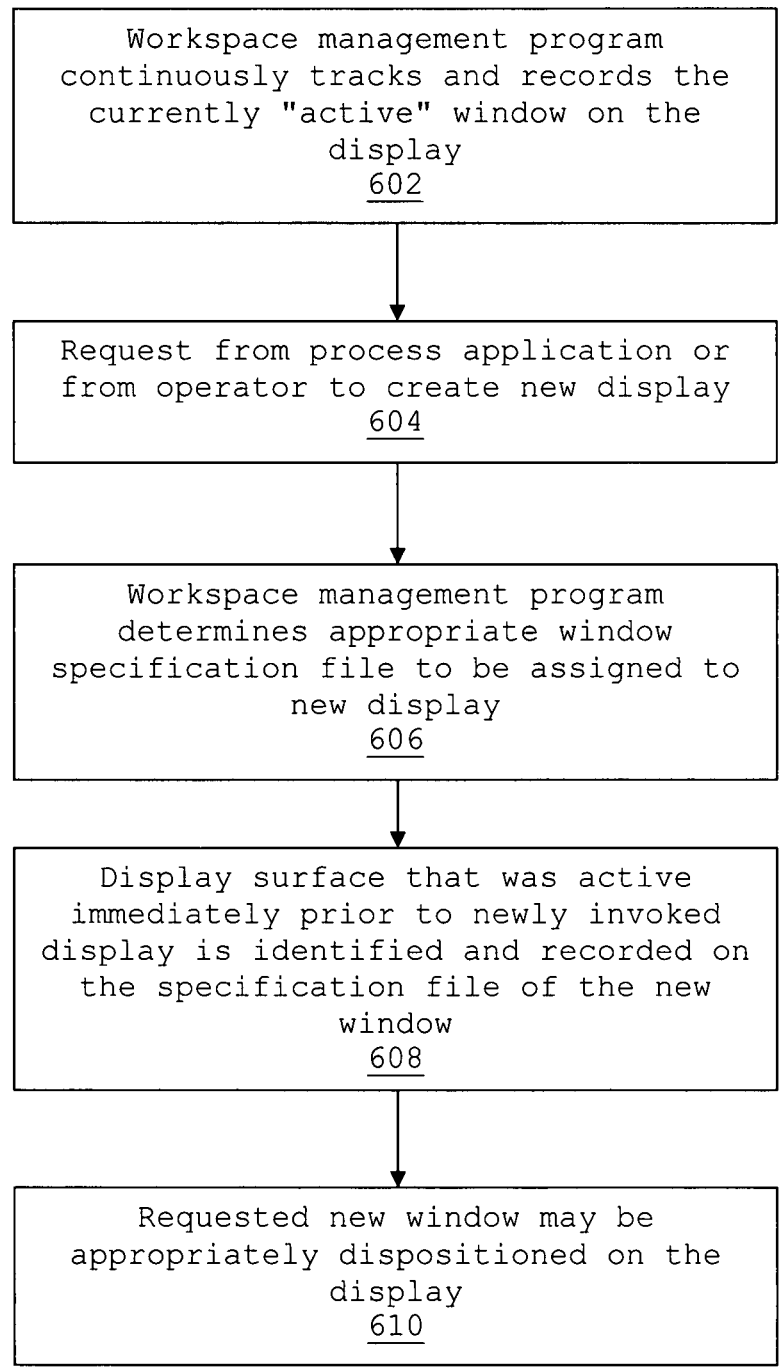
FIG. 6 is a block diagram of an exemplary method of the present invention.

Referring to FIG. 6, an exemplary method 600 may be implemented for a workspace management program to logically and intelligently disposition newly invoked displays in a multi-window display environment. The workspace management program may continuously track and record the currently "active" or "in-focus" window on the display 125 of the WSM 124 where an operator may be monitoring a plant process and interacting with the display 125 (block 602). A request may be made to the workspace management program from a process application or from the operator to create a new display (block 604). The newly invoked window may be assigned a window specification file as a result of the request (block 606). The determination of the appropriate specification file is performed by the workspace management program based on input from the request for a new window. The display surface that was active immediately prior to the request for a new display is identified and recorded on the specification file of the new display (block 608). The new window may now be intelligently displayed using the information contained in the window specification file (block 610).

Additional information on a portion of the process of creating and assigning specific window specification files may be found in U.S. Pat. No. 5,796,403 and is incorporated herein by reference. Additional information on the BIU 32 can be found in U.S. Pat. No. 4,556,974 and is incorporated herein by reference. A more detailed description of a process control system may be found by referring to U.S. Pat. No. 4,607,256. Additional description of the functional blocks of the physical modules may be found in U.S. Pat. No. 4,709,347 and is incorporated herein by reference. Additional information on the process controller 20' may be had by referencing U.S. Pat. No. 4,296,464 and is incorporated herein by reference.

Referring to FIG. 7, an exemplary specification file for a newly invoked window is shown. The workspace management program may receive a request for a new display window. Based on information in the request, the workspace manager may assign a specification file to the newly invoked display. Critical information governing the appearance and location of the newly invoked display may be contained within the specification file. Some information in the specification file may be pre-determined prior to runtime (e.g. physical characteristics given to specific window types). Information identifying the display surface from which the new window was invoked may be added to the specification file as the request is processed by the workspace management program. Window specification files may vary from the exemplary embodiment shown.

Under certain circumstances, a process control application may request a "critical" window that would signal to the operator that very close attention or immediate corrective action might be necessary. Such a critical window request may be identified as an alarm display or as a critical display. In an exemplary embodiment of the present invention, the critical window request may be initially processed similarly to an ordinary display request. The proper configuration file may be identified by the workspace management program. A determination may be made as to which display surface was recorded to have been active immediately prior to the critical window request. The identified display surface may be recorded in the configuration file for the newly invoked critical window. The category of the newly invoked critical window may also be recorded in the same configuration file. Now the workspace management program may use the information in the configuration file to assign the newly invoked critical window an always-on-top status. In addition, the display surface receiving the critical window may also be assigned an always-on-top status, as the identity of this surface is stored in the configuration file for the newly invoked critical window. Therefore, the operator may be immediately notified and have access to the display surface governing the process in which the critical event took place.

Persons skilled in the art will appreciate that the present invention can be practiced by other than the described examples and embodiments, which are presented for purposes of illustration rather than of limitation and that the present invention is limited only by the claims that follow.

What is claimed is:

1. A method of locating a newly invoked display in a multi-window display environment, the method comprising the steps of:
   a) continuously tracking currently active display surfaces, each of the display surfaces configured to present multiple displays;
   b) identifying one of the display surfaces that is determined to have been active immediately prior to a newly invoked display;
   c) updating a specification file for the newly invoked display to include an identity of the display surface identified in step (b); and
   d) displaying the newly invoked display in association with the display surface identified in step (b).

2. The method according to claim 1, wherein displaying the newly invoked display comprises displaying the newly invoked display in the display surface identified in step (b).

3. The method according to claim 1, wherein displaying the newly invoked display comprises displaying the newly invoked display in proximity to a display that invoked the newly invoked display.

4. The method according to claim 1, wherein the tracking, identifying, and displaying steps are performed using a display management system.

5. The method according to claim 1, wherein the multi-window display environment is a display system for a plant control network.

6. The method according to claim 1, further comprising the steps of:
   determining whether the newly invoked display is a critical display; and
   when the newly invoked display is determined to be a critical display, promoting a display status associated with the newly invoked display to an always-on-top status.

7. The method according to claim 1, wherein two or more of the display surfaces in the multi-window display environment have identical display characteristics.

8. A device for appropriately locating a newly invoked display in a multi-window display environment, the device comprising:
   a processing unit configured to:
      continuously track currently active display surfaces, each of the display surfaces configured to present multiple displays;
      identify one of the display surfaces that is determined to have been active immediately prior to the newly invoked display;
      update a specification file for the newly invoked display to include an identity of the identified display surface; and
      display the newly invoked display in association with the identified display surface.

9. The device according to claim 8, wherein the processing unit is configured to display the newly invoked display in the identified display surface.

10. The device according to claim 8, wherein the processing unit is configured to display the newly invoked display in proximity to a display that invoked the newly invoked display.

11. The device according to claim 8, wherein the processing unit is contained within a display management system.

12. The device according to claim 8, wherein the multi-window display environment is a display system for a plant control network.

13. The device according to claim 8, wherein the processing unit is further configured to:
    determine whether the newly invoked display is a critical display; and
    when the newly invoked display is determined to be a critical display, promote a display status associated with the newly invoked display to an always-on-top status.

14. The device according to claim 8, wherein two or more of the display surfaces in the multi-window display environment have identical display characteristics.

15. A machine-readable medium having instructions stored thereon for causing a machine to control displays in a multi-display environment, the instructions comprising:
    a) instructions for continuously tracking currently active display surfaces, each of the display surfaces configured to present multiple displays;
    b) instructions for identifying one of the display surfaces that is determined to have been active immediately prior to a newly invoked display;
    c) instructions for updating a specification file for the newly invoked display to include an identity of the identified display surface; and
    d) instructions for displaying the newly invoked display in association with the identified display surface.

16. The machine-readable medium of claim 15, wherein the instructions for displaying the newly invoked display comprise instructions for displaying the newly invoked display in the identified display surface.

17. The machine-readable medium of claim 15, wherein the instructions for displaying the newly invoked display comprise instructions for displaying the newly invoked display in proximity to a display that invoked the newly invoked display.

18. The machine-readable medium of claim 15, wherein the tracking, identifying, and displaying are performed using a display management system.

19. The machine-readable medium of claim 15, wherein the multi-window display environment is a display system for a plant control network.

20. The machine-readable medium of claim 15, wherein the instructions further comprise:
    instructions for determining whether the newly invoked display is a critical display; and
    instructions for, when the newly invoked display is determined to be a critical display, promoting a display status associated with the newly invoked display to an always-on-top status.

* * * * *